(12) United States Patent
Koga et al.

(10) Patent No.: US 9,562,172 B2
(45) Date of Patent: Feb. 7, 2017

(54) PHOTOCURABLE SHEET-TYPE ADHESIVE COMPOSITION FOR OPTICAL USE

(71) Applicant: THREE BOND FINE CHEMICAL CO., LTD., Kanagawa (JP)

(72) Inventors: Yoshiaki Koga, Kanagawa (JP); Yoshihide Arai, Kanagawa (JP); Takashi Nemoto, Kanagawa (JP)

(73) Assignee: THREE BOND FINE CHEMICAL CO., LTD., Kanagawa (JP)

( * ) Notice: Subject to any disclaimer, the term of this patent is extended or adjusted under 35 U.S.C. 154(b) by 124 days.

(21) Appl. No.: 14/379,038

(22) PCT Filed: Feb. 14, 2013

(86) PCT No.: PCT/JP2013/053533
§ 371 (c)(1),
(2) Date: Aug. 15, 2014

(87) PCT Pub. No.: WO2013/122144
PCT Pub. Date: Aug. 22, 2013

(65) Prior Publication Data
US 2015/0024218 A1    Jan. 22, 2015

(30) Foreign Application Priority Data
Feb. 17, 2012    (JP) ................. 2012-033441

(51) Int. Cl.
*C09J 7/00* (2006.01)
*C08G 18/67* (2006.01)
(Continued)

(52) U.S. Cl.
CPC .............. *C09J 7/00* (2013.01); *C08F 290/06* (2013.01); *C08F 299/06* (2013.01);
(Continued)

(58) Field of Classification Search
CPC ..... C08G 18/44; C08G 18/672; C08G 18/755; C08F 2220/285; C08F 290/06; C08F 299/06; C09J 7/00; C09J 11/06; C09J 109/00; C09J 153/00; C09J 171/12; C09J 175/14; C09J 175/16; C09J 187/005; C09J 2433/00; C09J 2471/00; C09J 2475/00; Y10T 428/31551
(Continued)

(56) References Cited

U.S. PATENT DOCUMENTS

2006/0252234 A1* 11/2006 Saiki ............................ 438/464
2009/0186552 A1    7/2009 Shinya et al.
(Continued)

FOREIGN PATENT DOCUMENTS

JP    2001-163931    6/2001
JP    2008-001739    1/2008
(Continued)

OTHER PUBLICATIONS

International Preliminary Report on Patentability for PCT/JP2013/053533, dated Aug. 28, 2014, and English translation thereof.
(Continued)

*Primary Examiner* — Thao T Tran
(74) *Attorney, Agent, or Firm* — Dickinson Wright PLLC

(57) ABSTRACT

An object of the present invention is to provide a photocurable sheet-type adhesive composition for optical use, which is used for bonding cover glass and a touch panel, a touch panel and a display module, or the like, and has high appearance reliability and storage stability even under high temperature and high humidity.

The present invention is a photocurable sheet-shape adhesive for optical use, which contains the following components (A) to (D): (A) 100 parts by mass of a urethane (meth)acrylate oligomer having a weight average molecular
(Continued)

weight of 20,000 to 100,000; (B) 3 to 70 parts by mass of a phenoxy resin having a glass transition temperature of 50 to 120° C.; (C) 0.1 to 10 parts by mass of a photopolymerization initiator; and (D) 1 to 50 parts by mass of a (meth) acrylate monomer which has 8 to 30 repeated blocks having an ether linkage in the molecule and containing at least one (meth)acryloyl group in the molecule.

4 Claims, 1 Drawing Sheet

(51) Int. Cl.
  *C08G 18/75* (2006.01)
  *C08F 290/06* (2006.01)
  *C09J 11/06* (2006.01)
  *C09J 109/00* (2006.01)
  *C09J 153/00* (2006.01)
  *C09J 171/12* (2006.01)
  *C09J 175/16* (2006.01)
  *C08F 299/06* (2006.01)
  *C09J 187/00* (2006.01)
  *C08F 220/28* (2006.01)
  *C09J 175/14* (2006.01)

(52) U.S. Cl.
  CPC ......... *C08G 18/672* (2013.01); *C08G 18/755* (2013.01); *C09J 11/06* (2013.01); *C09J 109/00* (2013.01); *C09J 153/00* (2013.01); *C09J 171/12* (2013.01); *C09J 175/16* (2013.01); *C09J 187/005* (2013.01); *C08F 2220/285* (2013.01); *C09J 175/14* (2013.01); *C09J 2433/00* (2013.01); *C09J 2471/00* (2013.01); *C09J 2475/00* (2013.01); *Y10T 428/31551* (2015.04)

(58) Field of Classification Search
  USPC .......................................... 428/423.1; 522/109
  See application file for complete search history.

(56) References Cited

U.S. PATENT DOCUMENTS

| | | | |
|---|---|---|---|
| 2010/0003425 | A1 | 1/2010 | Kamata et al. |
| 2010/0033661 | A1 | 2/2010 | Shinya et al. |
| 2010/0043965 | A1 | 2/2010 | Kamiya et al. |
| 2010/0097552 | A1 | 4/2010 | Shinya et al. |
| 2010/0097746 | A1 | 4/2010 | Toyoda et al. |
| 2010/0098839 | A1 | 4/2010 | Toyoda et al. |
| 2010/0134713 | A1 | 6/2010 | Toyoda et al. |
| 2011/0206869 | A1 | 8/2011 | Nemoto et al. |
| 2012/0118483 | A1 | 5/2012 | Toyoda et al. |

FOREIGN PATENT DOCUMENTS

| | | |
|---|---|---|
| JP | 2009-155503 | 7/2009 |
| JP | 2009-271489 | 11/2009 |
| JP | 2010-090204 | 4/2010 |
| JP | 2013-018871 | 1/2013 |
| WO | 2010/038366 | 4/2010 |
| WO | 2011/115224 | 9/2011 |

OTHER PUBLICATIONS

International Search Report for PCT/JP2013/053533, dated May 28, 2013, and English translation thereof.

Chinese Office Action dated Jul. 21, 2015 that issued in corresponding Chinese application No. 201380009767.4, including English translation.

\* cited by examiner

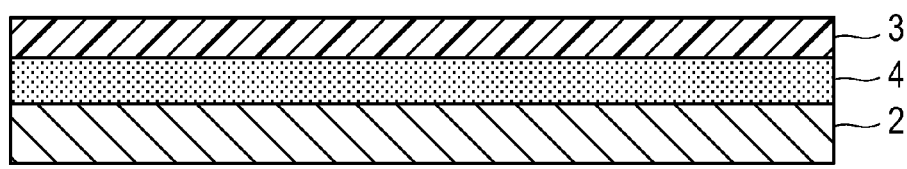

9,562,172 B2

PHOTOCURABLE SHEET-TYPE ADHESIVE COMPOSITION FOR OPTICAL USE

TECHNICAL FIELD

The present invention relates to a photocurable sheet-type adhesive composition for optical use, which is used to bond a display module and a cover panel, a touch panel and the display module, the cover panel and the touch panel, etc., and has high appearance reliability under high temperature and high humidity.

BACKGROUND ART

In an image display device such as a liquid crystal display and an organic EL display of the related art has a space provided between a display module and a cover panel, and an air layer between the cover panel and the display module scatters light due to a difference in refractive index, and thus decreases illuminance and contrast. Therefore, measures have been taken against these problems by filling the space between the cover panel and the display module with an ultraviolet curable resin in the form of liquid. Further, for the same reasons, the ultraviolet curable resin is also used between cover glass and a touch panel and between the touch panel and the display module.

Patent Literature 1 below discloses a liquid ultraviolet curable composition, which contains a polyurethane acrylate, an isobornyl acrylate, and a photopolymerization initiator. However, a method of bonding with such a liquid ultraviolet curable resin has failed to avoid problems of bubbles entrained at the time of attachment and of the resin protruded from an end.

In a method of bonding a cover panel and a display module, a photocurable sheet-shape adhesive has been examined as one in which bubble entrainment or protrusion does not occur. Patent Literature 2 discloses, as a photocurable sheet-shape adhesive, a photocurable adhesive composition which contains a urethane (meth)acrylate oligomer having a specific molecular weight, a phenoxy resin, and a photopolymerization initiator. However, since a display module has used for a wide variety of devices, and the usage environments thereof have also gradually been harsh, when a device having a cover panel and a display module sealed with the composition disclosed in Patent Literature 2 is used under various conditions, it has been found that white turbidity occurs in an adhesive layer and transparency is impaired in the condition under high temperature and high humidity.

CITATION LIST

Patent Literatures

Patent Literature 1: JP 2009-271489 A
Patent Literature 2: JP 2010-090204 A

SUMMARY OF INVENTION

The technique of the related art described in Patent Literature 2 mentioned above has had a tendency of decreasing storage stability when an attempt is made to remedy the white turbidity under high temperature and high humidity. The present invention has been made in order to solve the problems including such a problem. In other words, the present invention is to provide a photocurable sheet-type adhesive composition for optical use, which is used to bond a display module and a cover panel, a touch panel and the display module, or the cover panel and the touch panel, etc., has high appearance reliability, and is excellent in storage stability, without the occurrence of white turbidity even under high temperature and high humidity.

The summary of the present invention will be described next. Aspects of the present invention are intended to overcome the problems of the related art mentioned above. In other words, the present invention has the following summary.

A photocurable sheet-shape adhesive for optical use, which contains components (A) to (D):
(A) 100 parts by mass of a urethane (meth)acrylate oligomer having a weight average molecular weight of 20,000 to 100,000; (B) 3 to 70 parts by mass of a phenoxy resin having a glass transition temperature of 50 to 120° C.; (C) 0.1 to 10 parts by mass of a photopolymerization initiator; and (D) 1 to 50 parts by mass of a (meth)acrylate monomer which has 8 to 30 repeated blocks having an ether linkage in the molecule and containing at least one (meth) acryloyl groups in the molecule.

BRIEF DESCRIPTION OF DRAWINGS

FIG. 1 is a schematic cross-sectional view illustrating a configuration of an image display device which uses a photocurable sheet-type adhesive composition for optical use of the present invention.

DESCRIPTION OF EMBODIMENTS

The present invention is favorably used to bond a display module and a cover panel, a touch panel and the display module, the cover panel and the touch panel, etc., because the present invention is excellent in transparency and is a flexible cured product. Furthermore, the present invention is a photocurable sheet-type adhesive composition for optical use which has high appearance reliability and an effect of being excellent in storage stability, because white turbidity is suppressed even under high temperature and high humidity.

Details of the invention will be described below.

[Component (A)]

The urethane (meth)acrylate oligomer as the component (A) used in the present invention is not particularly limited, but preferably a urethane meth(acrylate) oligomer composed of a reaction product of a polyol compound having two or more hydroxyl groups in the molecule, a compound having two or more isocyanate groups in the molecule, and a (meth)acrylate containing at least one hydroxyl group in the molecule. The weight average molecular weight of the component (A) is preferably 20,000 to 100,000, further preferably 25,000 to 90,000, and particularly preferably 30,000 to 80,000. When the weight average molecular weight is more than 100,000, conformity is poor at an interface when attaching an adherend such as a display module and a panel, and there is a risk that an adhesive layer undergoes white turbidity under a high-temperature and high-humidity environment. When the weight average molecular weight is less than 20,000, there is a risk that it is difficult to maintain a solid state of the uncured composition at normal temperature. It is to be noted that the weight average molecular weight herein refers to a weight average molecular weight which is measured by gel permeation chromatography and converted with polystyrene.

Examples of the polyol compound having two or more hydroxyl groups in the molecule include polyether polyol, polyester polyol, caprolactone diol, bisphenol polyol, polyisoprene polyol, hydrogenated polyisoprene polyol, polybutadiene polyol, hydrogenated polybutadiene polyol, castor oil polyol, and polycarbonate diol. Above all, polycarbonate diol, polybutadiene polyol, and hydrogenated polybutadienepolyol are preferred because of their excellent transparency and excellent durability, and particularly preferable examples include polycarbonate diol from the perspective that a cured product without the occurrence of white turbidity in an adhesive layer when placed under high temperature and high humidity can be obtained. These compounds may be used singly, or more than one compound thereof may be used in combination. The present inventors have confirmed that polybutadiene polyol and hydrogenated polybutadiene polyol achieves effects similar to that of polycarbonate diol, although the mechanism is not known. In other words, a preferred embodiment includes the photocurable sheet-shape adhesive for optical use, wherein the component (A) is a compound having at least one structure selected from the group consisting of polycarbonate skeleton, polybutadiene skeleton, and hydrogenated polybutadiene skeleton.

Examples of the compound having two or more isocyanate groups in a molecule include aromatic polyisocyanate, alicyclic polyisocyanate, and aliphatic polyisocyanate, and above all, alicyclic polyisocyanate and aliphatic polyisocyanate are preferred from the perspective that a flexible cured product can be obtained. These compounds may be used singly, or more than one compound thereof may be used in combination.

Examples of the aromatic polyisocyanate include 2,4-tolylenediisocyanate, 2,6-tolylenediisocyanate, 1,3-xylylenediisocyanate, 1,4-xylylenediisocyanate, tetramethylxylylenediisocyanate, diphenylmethanediisocyanate, naphthalene-1,5-diisocyanate, and triphenylmethanetriisocyanate, examples of the alicyclic polyisocyanate include isophoronediisocyanate, bis(4-isocyanatocyclohexyl)methane, 1,3-bis(isocyanatomethyl)cyclohexane, 1,4-bis(isocyanatomethyl)cyclohexane, norbornanediisocyanate, and bicycloheptanetriisocyanate, and examples of the aliphatic polyisocyanate include hexamethylene diisocyanate, 1,3,6-hexamethylene triisocyanate, and 1,6,11-undecatriisocyanate. Above all, diisocyanate such as isophoronediisocyanate and hexamethylene diisocyanate is preferred, because a cured product without the occurrence of white turbidity in an adhesive layer when placed under high temperature and high humidity can be obtained.

Examples of the (meth)acrylate at least containing one or more hydroxyl groups in the molecule include: mono(meth)acrylates of dihydric alcohols such as ethylene glycol, propylene glycol, 1,3-propanediol, 1,3-butanediol, 1,4-butanediol, and polyethylene glycol; and mono(meth)acrylates or di(meth)acrylates of trihydric alcohols such as trimethylolethane, trimethylolpropane, and glycerin. Among these compounds, from the perspective that a cured product excellent in flexibility can be obtained, mono(meth)acrylates of dihydric alcohols are preferred, and more preferred are mono(meth)acrylates of ethylene glycol. These compounds may be used singly, or more than one compound thereof may be used in combination.

The method of synthesizing the urethane (meth)acrylate oligomer as the component (A) is not particularly limited, and a known method can be used. For example, the polyol compound having two or more hydroxyl groups in the molecule and the isocyanate compound having two or more isocyanate groups in the molecule are reacted preferably at a molar ratio (polyol compound:isocyanate compound) of 3:1 to 1:3, further preferably 2:1 to 1:2 in a diluent (for example, methyl ethyl ketone, methoxyphenol, etc.) to obtain aurethane prepolymer. Then, further, the isocyanate groups remaining in the obtained urethane prepolymer is reacted with a (meth)acrylate containing at least one hydroxyl group in the molecule in a sufficient amount to react with the isocyanate groups to synthesize a urethane (meth)acrylate oligomer, as an example of the method.

Examples of the catalyst for use in the synthesis can include lead oleate, tetrabutyl tin, antimony trichloride, triphenyl aluminum, trioctyl aluminum, dibutyl tindilaurate, copper naphthenate, zinc naphthenate, zinc octoate, zinc octenoate, zirconium naphthenate, cobalt naphthenate, tetra-n-butyl-1,3-diacetyloxydistannoxane, triethylamine, 1,4-diaza[2,2,2]bicyclooctane, and N-ethylmorpholine, and above all, dibutyl tin dilaurate, zinc naphthenate, zinc octoate, and zinc octenoate are preferably used because a cured product which is high in activity and excellent in transparency can be obtained. These catalysts are preferably used in 0.0001 to 10 parts by mass with respect to 100 parts by mass of the total amount of a reactant. The reaction temperature is typically from 10 to 100° C., particularly preferably from 30 to 90° C.

[Component (B)]

The phenoxy resin as the component (B) for use in the present invention is, for example, a compound derived from epichlorohydrin and a bisphenol or the like. The phenoxy resin is used for the purpose of aiding film formation to keep the composition in a solid state at normal temperature. Examples of the phenoxy resin as the component (B) include bisphenol-type phenoxy resins, novolac-type phenoxy resins, naphthalene-type phenoxy resins, and biphenyl-type phenoxy resins. These resins may be used singly, or more than one resin thereof may be used in combination. As the phenoxy resin, in particular, bisphenol-type phenoxy resins are preferred from the perspective of favorable adhesion to glass or plastic of a protective panel. Above all, copolymerized phenoxy resins of bisphenol A and bisphenol F are preferred from the perspective of being compatible with the component (A) of the present invention and from the perspective that a cured product having flexibility can be obtained. These resins may be used singly, or more than one resin thereof may be used in combination.

In addition, in order to improve an attachment property to a display device, etc., and conformity with an adherend when pressure bonding, it is preferable to soften the sheet-shape adhesive at the hot press, and for this reason, the phenoxy resin preferably has a glass transition temperature in the range of 50 to 120° C., more preferably in the range of 60 to 90° C. as an example. When the glass transition temperature is less than 50° C., there is high stickiness and there is a risk that the handling ability for a film decreases, whereas when the glass transition temperature is higher than 120° C., there is poor conformity at an interface when attaching to an adherend such as a display module or panel and there is a risk that an adhesive layer undergoes white turbidity under a high-temperature and high-humidity environment.

Commercially available products can be used as the phenoxy resin of the component (B). The commercially available products include, for example, PHENOTOHT YP-50, PHENOTOHT YP-50S, PHENOTOHT YP-55, PHENOTOHT YP-70, ZX-1356-2, FX-316 (from Nippon Steel Chemical Co., Ltd.), JER1256, JER4250 or JER4275 (from Mitsubishi Chemical Corporation), PKHB, PKHC, PKHH, PKHJ, and PKFE (from Inchem).

The blend amount of the component (B) in the present invention is preferably 3 to 70 parts by mass, more preferably 5 to 60 parts by mass, and particularly preferably 15 to 50 parts by mass with respect to 100 parts by mass of the component (A). The amount exceeding 70 parts by mass makes it difficult for the sheet-shape adhesive to flow due to heating, whereas the amount of less than 3 parts by mass makes it difficult to keep the uncured composition in a solid state at normal temperature, and significantly increases the stickiness, thus making the handling ability of the composition worse.

[Component (C)]

The photoradicalpolymerization initiator as the component (C) for use in the present invention is a compound which generates radicals by irradiating active energy rays such as ultraviolet rays. Examples of the component (C) include acetophenone-based photoradicalpolymerization initiators, benzoin-based photoradicalpolymerization initiators, benzophenone-based photoradicalpolymerization initiators, thioxanthone-based photoradicalpolymerization initiators, and acylphosphineoxide-based photoradicalpolymerization initiators, and above all, the acylphosphineoxide-based photoradicalpolymerization initiators are preferred from the perspective of being adequately photocurable even by light irradiation through a cover panel such as polycarbonate, and from the perspective that a curable composition with suppressed white turbidity even under high temperature and high humidity can be obtained. In addition, these initiators may be used singly, or more than one initiator thereof may be used in combination.

The acetophenone-based photoradicalpolymerization initiators include, but not limited to, for example, diethoxy acetophenone, 2-hydroxy-2-methyl-1-phenylpropane-1-one, benzyldimethylketal, 4-(2-hydroxyethoxy)phenyl-(2-hydroxy-2-propyl)ketone, 1-hydroxycyclohexylphenylketone, 2-methyl-2-morpholino(4-thiomethylphenyl)propane-1-one, 2-benzyl-2-dimethylamino-1-(4-morpholinophenyl) butanone, and 2-hydroxy-2-methyl-1-[4-(1-methylvinyl) phenyl]propanone oligomers.

The benzoin-based photoradicalpolymerization initiators include, but not limited to, for example, benzoin, benzoin methyl ether, benzoin ethyl ether, benzoin isopropyl ether, and benzoin isobutyl ether.

The benzophenone-based photoradicalpolymerization initiators include, but not limited to, for example, benzophenone, methyl o-benzoylbenzoate, 4-phenylbenzophenone, 4-benzoyl-4'-methyl-diphenylsulfide, 3,3',4,4'-tetra(t-butylperoxycarbonyl)benzophenone, 2,4,6-trimethylbenzophenone, 4-benzoyl-N,N-dimethyl-N-[2-(1-oxo-2-propenyloxy)ethyl]benzene meta-Nami bromide, and (4-benzoylbenzyl)trimethylammonium chloride.

The thioxanthone-based photoradicalpolymerization initiators include, but not limited to, for example, 2-isopropylthioxanthone, 4-isopropylthioxanthone, 2,4-diethylthioxanthone, 2,4-dichlorothioxanthone, 1-chloro-4-propoxythioxanthone, and 2-(3-dimethylamino-2-hydroxy)-3,4-dimethyl-9H-thioxanthone-9-onemethochloride.

The acylphosphineoxide-based photoradicalpolymerization initiators include, but not limited to, for example, bis(2,4,6-trimethylbenzoyl)-phenylphosphine oxide, 2,4,6-trimethylbenzoyl-diphenylphosphine oxide, and 2,4,6-trimethylbenzoylphenylethoxyphosphine oxide.

The blend amount of the component (C) in the present invention is preferably 0.1 to 10 parts by mass, and more preferably 0.3 to 5 parts by mass with respect to 100 parts by mass of the component (A). When the amount exceeds 10 parts by mass, there is a risk that the transparency of a cured product is impaired, whereas when the amount is less than 0.1 parts by mass, there is a risk that the photocurability of the composition decreases.

[Component (D)]

The component (D) for use in the present invention is a (meth)acrylate monomer containing an ether linkage and a (meth)acryloyl group. A preferred embodiment is the above-mentioned photocurable sheet-shape adhesive for optical use, wherein the component (D) has at least 8 to 25 repeated blocks of an ether linkage in the molecule. From the perspective of suppressing white turbidity of an adhesive layer that occurs by placement under high temperature and high humidity, the component (D) is a (meth)acrylate monomer which preferably has 8 to 30 repeated blocks with an ether linkage in the molecule, more preferably has 9 to 27 or 8 to 25 repeated blocks with ether linkages in the molecule, and further preferably has 10 to 25 repeated blocks with ether linkages in the molecule. When a (meth)acrylate monomer having less than 8 repeated blocks having an ether linkage is used, white turbidity occurs in the adhesive layer when placed under high temperature and high humidity, and there is a risk that transparency is impaired. When the number of repeated blocks of an ether linkage is more than 30, the compound is crystallized and thus there is a risk that a cured product undergoes white turbidity. The component (D) is preferably a (meth)acrylate monomer containing at least one (meth)acryloyl group in the molecule, from the perspective of eliminating elution under high-temperature and high-humidity environments by reaction with the component (A) of the present invention. When a (meth)acrylate monomer which contains no (meth)acryloyl group is used, there is a risk that an adhesive layer undergoes white turbidity by placed under high temperature and high humidity. These monomers may be used singly, or more than one monomer thereof may be used in combination.

Examples of the (meth)acrylate monomer containing a (meth)acryloyl group and having 8 to 30 repeated structural units with an ether linkage of the component (D) of the present invention include polyethylene glycol mono(meth) acrylate, polyethylene glycol di(meth)acrylate, polypropylene glycol mono(meth)acrylate, polypropylene glycol di(meth)acrylate, polyoxytetramethylene glycol mono (meth)acrylate, and polyoxytetramethylene glycol di(meth) acrylate. The molecular weight of the component (D) of the present invention is preferably in the range of 200 to 5,000, and more preferably 250 to 3,000. When the molecular weight deviates from the range of 200 to 5,000, there is a risk that an adhesive layer when placed under high temperature and high humidity undergoes white turbidity. Commercially available products include, but not limited to, for example, M-90G, AM-130G, M-90G, M-230G, A-400, A-600, APG-700, A-1000, 9G, 14G, 23G, 1206PE (from Shin Nakamura Chemical Co., Ltd.), PDE-600, PDP-700, ADE-600 (from NOF CORPORATION), LIGHT ESTER 130MA, LIGHT ESTER 130MA, LIGHT ESTER 130A, 14EG, and 14EG-A (from Kyoeisha Chemical Co., Ltd.).

The blend amount of the component (D) in the present invention is preferably 1 to 50 parts by mass, more preferably 2 to 30 parts by mass, and particularly preferably 2.5 to 20 parts by mass with respect to 100 parts by mass of the component (A). When the amount exceeds 50 parts by mass, flexibility of a cured product is impaired and thus there is a risk that shock-absorbing performance decreases. Moreover, there is also a risk that an adhesive layer undergoes white turbidity in the case of placement under high temperature and high humidity. When the blend amount is less than 1 part by mass, there is a risk that an adhesive layer undergoes white turbidity when placing it under high temperature and high humidity.

To the present invention, in the range that does not impair the purpose of the present invention, the following additives may appropriately be blended: ethylenically unsaturated compounds other than the component (A) and the component (D); silane coupling agents; various types of elastomers such as acrylic rubbers, urethane rubbers, and styrene copolymers; and fillers, storage stabilizers, antioxidants, light stabilizers, adhesive aids, plasticizers, dyes, pigments, flame retardants, sensitizers, thermal radical initiators, organic solvents, heavy-metal deactivators, ion trapping agents, emulsifiers, water dispersion stabilizers, antifoamers, mold release agents, leveling agents, waxes, rheology controlling agents, and surfactants.

For the present invention, monofunctional, difunctional, trifunctional, and multifunctional monomers, oligomers, etc. having (meth)acryloyl groups, for example, can be used as the ethylenically unsaturated compounds other than the component (A) and the component (D). These compounds can be used singly, or as a mixture of two or more thereof.

The monofunctional monomers include, for example, lauryl (meth)acrylate, stearyl (meth)acrylate, tetrahydrofurfuryl (meth)acrylate, caprolactone-modified tetrahydrofurfuryl (meth)acrylate, cyclohexyl (meth)acrylate, dicyclopentanyl (meth)acrylate, isobornyl (meth)acrylate, benzyl (meth)acrylate, phenyl (meth)acrylate, phenoxyethyl (meth)acrylate, phenoxydiethylene glycol (meth)acrylate, phenoxytetraethylene glycol (meth)acrylate, nonylphenoxyethyl (meth)acrylate, butoxyethyl (meth)acrylate, 2-hydroxyethyl (meth)acrylate, 2-hydroxypropyl (meth)acrylate, glycerol (meth)acrylate, modified butyl (meth)acrylate, epichlorohydrin-modified phenoxy(meth)acrylate, N,N-dimethylaminoethyl (meth)acrylate, N,N-diethylaminoethyl (meth)acrylate, and morpholino (meth)acrylate.

The difunctional monomers include, for example, neopentyl glycol di(meth)acrylate, bisphenol A di(meth)acrylate, epichlorohydrin-modified bisphanol A di(meth)acrylate, stearic acid-modified pentaerythritol di(meth)acrylate, dicyclopentenyl acrylate, and di(meth)acryloyl isocyanurate.

The trifunctional monomers include, for example, trimethylolpropane tri(meth)acrylate, pentaerythritol tri(meth)acrylate, epichlorohydrin-modified trimethylolpropane tri(meth)acrylate, epichlorohydrin-modified glycerol tri(meth)acrylate, and tris(acryloyloxyethyl)isocyanurate.

The multifunctional monomers include, for example, ditrimethylolpropane tetra(meth)acrylate, pentaerythritol tetra(meth)acrylate, dipentaerythritol monohydroxypenta(meth)acrylate, alkyl-modified dipentaerythritol pentaacrylate, and dipentaerythritol hexa(meth)acrylate.

These polymerizable monomers can be used singly, or as a mixture of two or more thereof.

Furthermore, to the photocurable sheet-type adhesive composition of the present invention, a silane coupling agent may be blended for the purpose of improving the adhesion to a display panel, a cover panel, or a touch panel. Examples of the silane coupling agent include: glycidyl group-containing silane coupling agents such as 2-(3,4-epoxycyclohexyl)ethyltrimethoxysilane, 3-glycidoxypropyltriethoxysilane, 3-glycidoxypropylmethyldimethoxysilane, 3-glycidoxypropyltrimethoxysilane, and 3-glycidoxypropylmethyldiethoxysilane; vinyl group-containing silane coupling agents such as vinyltris(β-methoxyethoxy)silane, vinyltriethoxysilane, and vinyltrimethoxysilane; (meth)acrylic group-containing silane coupling agents such as γ-methacryloxypropyltrimethoxysilane; amino group-containing silane coupling agents such as N-β-(aminoethyl)-γ-aminopropyltrimethoxysilane, γ-aminopropyltriethoxysilane, and N-phenyl-γ-aminopropyltrimethoxysilane; other γ-mercaptopropyltrimethoxysilane; and γ-chlorotrimethoxysilane. Among these coupling agents, from the perspective that further improved adhesion can be expected, the glycidyl group-containing silane coupling agents and (meth)acrylic group-containing silane coupling agents are preferably used. These agents may be used singly, or two or more thereof may be used in combination.

For the purpose of improving the elastic modulus, fluidity, etc. of a cured product, the filler may be added to the present invention in the extent that does not disturb the storage stability. Specific examples of the filler include organic powders, inorganic powders, and metallic powders.

The inorganic powder fillers include glass, fumed silica, alumina, mica, ceramics, silicone rubber powders, calcium carbonate, aluminum nitride, carbon powders, kaolin clay, dried clay minerals, and dried diatomaceous earth. The blend amount of the inorganic powders is preferably on the order of 0.1 to 100 parts by weight with respect to 100 parts by weight of the component (A).

The fumed silica filler is blended for the purpose of improving the mechanical strength of the cured product. Preferably, for example, fumed silica which is hydrophobized with organochlorosilanes, polyorganosiloxane, hexamethyldisilazane, or the like is used preferably. Specific examples of the fumed silica include, for example, commercially available products such as trade names AEROSIL R974, R972, R972V, R972CF, R805, R812, R812S, R816, R8200, RY200, RX200, RY200S, and R202 from Nippon Aerosil Co., Ltd.

The addition of the antioxidant and the light stabilizer among the optional components mentioned above is preferred to improve the storage stability of the photocurable sheet-type adhesive composition and the weather resistance of the curable composition. Phenolic antioxidants, hindered phenol antioxidants, organic sulfur antioxidants, amine antioxidants, and benzotriazole antioxidants can be used as the antioxidant. Hindered amine light stabilizers and benzoate light stabilizers can be used as the light stabilizer. Moreover, the following commercially available products can be used as the antioxidant and the light stabilizer. Examples thereof include: SUMILIZER BHT, SUMILIZER S, SUMILIZER BP-76, SUMILIZER MDP-S, SUMILIZER GM, SUMILIZER BBM-S, SUMILIZER WX-R, SUMILIZER NW, SUMILIZER BP-179, SUMILIZER BP-101, SUMILIZER GA-80, SUMILIZER TNP, SUMILIZER TPP-R, SUMILIZER P-16 (from Sumitomo Chemical Company, Limited); ADEKASTAB AO-20, ADEKASTAB AO-30, ADEKASTAB AO-40, ADEKASTAB AO-50, ADEKASTAB AO-60, ADEKASTAB AO-70, ADEKASTAB AO-80, ADEKASTAB AO-330, ADEKASTAB PEP-4C, ADEKASTAB PEP-8, ADEKASTAB PEP-24G, ADEKASTAB PEP-36, ADEKASTAB HP-10, ADEKASTAB 2112, ADEKASTAB 260, ADEKASTAB 522A, ADEKASTAB 329K, ADEKASTAB 1500, ADEKASTAB C, ADEKASTAB 135A, ADEKASTAB 3010 (from ASAHI DENKA Co., Ltd.); TINUVIN 770, TINUVIN 765, TINUVIN 144, TINUVIN 622, TINUVIN 111, TINUVIN 123, and TINUVIN 292 (from Ciba Specialty Chemicals Inc.). The blend amount of the antioxidant and light stabilizer is not particularly limited, but preferably 0.001 to 5 parts by mass, and more preferably 0.01 to 3 parts by mass with respect to 100 parts by mass of the component (A).

A known technique can be used as a method of processing the photocurable adhesive composition of the present invention into a form of sheet or film. For example, a sheet- or film-like composition which has any film thickness can be obtained by diluting the composition of the present invention with a solvent to prepare a coating liquid in the form of liquid, then coating a support such as a polyethylene terephthalate film treated to release easily from a mold in advance with the coating liquid by a flow coating method, a roll coating method, a gravure roll method, a wire bar method, a lip die coating method, or the like, and then drying the solvent. In the preparation of the coating liquid, the respective components may be blended, and then diluted with the solvent, or the respective components may be diluted with the solvent in advance before blending the components.

Examples of the solvent of use which can be used in the present invention include alcohols such as methanol and ethanol; chlorinated solvents such as dichloroethane and trichloroethane; fluorinated solvents such as trichlorofluoroethane; ketone solvents such as acetone, methyl ethyl ketone, and methyl isobutyl ketone; acetate ester solvents such as methyl acetate, ethyl acetate, propyl acetate, and butyl acetate; dimethyl ether, methyl ethyl ether, diethyl ether; alkane solvents such as pentane, hexane, heptane, and cyclohexane; and aromatic hydrocarbon solvents such as benzene, toluene, and xylene. Above all, the ketone solvents are preferred because of their high compatibility with the component (A), component (B), and component (D) of the present invention.

The thickness of an adhesive layer is preferably on the order of 1 to 500 μm, more preferably 5 to 400 μm, further preferably 10 to 200 μm. When the thickness of the adhesive layer is less than 1 μm, there is a risk that a display device has insufficient shock resistance when the present invention is used for attachment between a cover panel and a display module. When the thickness is more than 500 μm, there is a risk of losing transparency.

Examples of the material for the mold-released film include plastic films such as polyethylene, polypropylene, polyethylene terephthalate, and polyester films; paper; textiles; and non-woven fabrics, and plastic films are preferred from the perspective of mold release performance. The mold-released film preferably has the thickness of 5 to 300 μm, more preferably on the order of 25 to 200 μm. The mold-released film is preferably a film that was treated to easily release from a mold with a fluorinated compound, a silicone compound, a long-chain alkyl compound, or the like, from the perspective that the peeling performance from the adhesive layer can be increased.

Next, a method of attachment between a display module and a cover panel with the use of the photocurable sheet-shape adhesive for optical use of the present invention will be described. The attachment method is roughly constituted by three steps of: a transfer step; an attachment step; and a curing step. While a method of attachment between a display module and a cover panel will be given as an example, the method can be also used in a similar way between a cover panel and a touch panel or between a touch panel and a display module.

[Transfer Step]

As a transfer method, a separator film on the lightly peeling side of the sheet-shape adhesive is peeled and the surface is pressure bonded to a display module 2 or a protective panel 3. From the perspective of increasing the adhesion to an adherend, it is preferable to carry out the transfer while applying heat and pressure by the use of a roll laminating machine.

[Attachment Step]

After the transfer, a base material film remaining on the sheet-shape adhesive is peeled, the remaining panel surfaces are brought together and pressed while heat is applied to the adherend, and attachment is carried out. In this case, the attachment in vacuum or a reduced-pressure atmosphere is preferred from the perspective that attachment without bubbles is possible. A device for attachment includes a vacuum pressing machine and a vacuum laminating machine, as well as an autoclave.

[Curing Step]

Active energy rays is irradiated to the attached panels from the protective panel side to cure a sheet-shape adhesive 4, thereby integrating the panels with each other. The photocurable sheet-shape adhesive of the present invention also rapidly cures by active energy ray irradiation to form a tough cured product, and develops a strong adhesive force to glass and plastic. In regard to active energy ray irradiation, irradiation light in a wavelength region of 150 to 750 nm is preferred, a low pressure mercury lamp, a medium pressure mercury lamp, a high pressure mercury lamp, an ultrahigh pressure mercury lamp, a xenon lamp, a metal halide lamp, or an LED lamp can be used for curing with integral light from 1 to 100 kJ/m$^2$, and the integral light is preferably 5 to 70 kJ/m$^2$.

FIG. 1 is a schematic cross-sectional view schematically illustrating an example of an image display device which is assembled with the use of the photocurable sheet-shape adhesive for optical use of the present invention. As shown in FIG. 1, an image display device 1 has the photocurable sheet-shape adhesive 4 of the present invention placed on the display module 2, and has the cover panel (protective panel) 3 placed thereon. In other words, the display module 2 and the cover panel 3 are bonded with the photocurable sheet-shape adhesive 4 of the present invention.

Besides the embodiment shown in FIG. 1, it can be also an embodiment to bond with the photocurable sheet-shape adhesive of the present invention between the cover panel and a touch panel, and between the touch panel and the display module. In other words, a preferred embodiment is an image display device including either a display module and a cover panel, a cover panel and a touch panel, or a touch panel and the display module bonded with the above-mentioned photocurable sheet-shape adhesive for optical use. The photocurable sheet-shape adhesive of the present invention is excellent in light transmission and elastic modulus, and thus favorable to bond the above-mentioned members of the image display device. Furthermore, the image display device of the present invention can maintain a sufficient light transmission while an image display section does not show white turbidity even under high temperature and high humidity, because the photocurable sheet-shape adhesive of the present invention is used for bonding.

Examples of the display module in the present invention include, but not limited to, a liquid crystal display device, an organic electroluminescence display device, and a PDP (plasma display panel). Examples of the touch panel of the present invention include, but not limited to, a resistive touch panel, a capacitance touch panel, an electromagnetic induction touch panel, an infrared touch panel, and an ultrasonic touch panel. Examples of the cover panel in the present invention include, but not limited to, a polycarbonate plate, an acrylic plate, and a glass plate.

The cured product of the photocurable sheet-shape adhesive for optical use of the present invention preferably has an elastic modulus of $10^8$ Pa or less. Because, when the elastic modulus is higher than $10^8$ Pa, shock-absorbing characteristics cannot be sufficiently obtained in the case of bonding between a display module and a cover panel, between the cover panel and a touch panel, or between the touch panel and the display module, external stress propagates to a display device and there is a risk of causing display defects.

The cured product of the photocurable sheet-shape adhesive for optical use of the present invention preferably shows a total light transmittance of 85% or higher. When the total light transmittance is less than 85%, there is a risk that sufficient transparency cannot be obtained when bonding between a display module and a cover panel, between the cover panel and a touch panel, or between the touch panel and the display module. It is to be noted that the total light transmittance is a value measured in accordance with the JIS-K-7361-1 (1997).

The cured product of the photocurable sheet-shape adhesive for optical use of the present invention can exhibit an elongation percentage of 500% or more. The elongation percentage refers to a value measured in conformity with the JIS-K-6251 (2010). The cured product can exhibit a peeling bond strength of 0.5 N/mm or more. The peeling bond strength refers to a value measured in conformity with the JIS-K-6854-1 (1999). As just described, since the cured product of the photocurable sheet-shape adhesive for optical use of the present invention is excellent in mechanical characteristics of elongation percentage and peeling bond strength, the cured product can favorably be applied even to a flexible sheet material, and provide durable parts when the cured product is used for bonding a display module and a cover panel, etc.

EXAMPLES

While the present invention will be described below in more detail with reference to examples, the present invention is not to be considered limited to the examples.

Test methods used in the examples and comparative examples are as follows.
<Preparation of Composition>

Each component was acquired in parts by mass shown in Tables 1 and 2, mixed with a mixer for 30 minutes at normal temperature to prepare a resin composition, and various types of physical properties of the composition were measured in the following way. The detailed added amounts accord with Tables 1 and 2. Numerical values are all described in terms of parts by mass.

Synthesis Example 1

Urethane Acrylate Oligomer A

Into a glass reaction container equipped with a thermometer, an agitator, and a reflux tube, 582.26 parts by mass of methyl ethyl ketone, 59.94 parts by mass of isophorone diisocyanate, 0.05 parts by mass of 4-methoxyphenol, and 0.1 parts by mass of dibutyltin dilaurate were introduced, and heated to 60° C. under agitation. Thereto, 520 parts by mass of polycarbonate diol (T5651 from Asahi Kasei Chemicals Corp.) heated to 70° C. was added drop by drop. After the completion of the dropping, the reaction was developed by agitation for 3 hours. Then, 2.32 parts by mass of 2-hydroxyethyl acrylate was added drop by drop, and after the completion of the dropping, the reaction was developed by agitation for 3 hours. It is to be noted that the molar ratio of isophorone diisocyanate:polycarbonate diol was 1:2. The disappearance of isocyanate groups was confirmed by infrared spectroscopy, and regarded as the completion of the reaction, and a polycarbonate urethane acrylate was obtained. The weight average molecular weight was 60,000.

Comparative Synthesis Example 1

Urethane Acrylate Oligomer B

Except for the use of 410 parts by mass of methyl ethyl ketone, 12.2 parts by mass of tolylenediisocyanate, 0.1 parts by mass of 4-methoxyphenol, 0.1 parts by mass of dibutyl tin dilaurate, 360 parts by mass of polyester diol, and 2.0 parts by mass of 2-hydroxyethyl acrylate, the comparative synthesis example was implemented in the same way as in Synthesis Example 1. The weight average molecular weight of the obtained polyester urethane acrylate was 5,000.
[Component a]
a1: Urethane Acrylate Oligomer A
[Comparative Component to Component a]
a'1: Urethane Acrylate Oligomer B
a'2: RC100C; Acrylic Copolymer having (Meth)acrylic Groups at Terminals (from KANEKA CORPORATION)
[Component b]
b1: YP-70; Copolymer-type Phenoxy Resin of Bisphenol A and Bisphenol F, Weight Average Molecular Weight of 50,000, Glass Transition Temperature of 70° C. (from Nippon Steel Chemical Co., Ltd.)
[Comparative Component to Component b]
b'1: ERF-001M30; Copolymer-type Phenoxy Resin of Bisphenol A and Bisphenol S, Glass Transition Temperature of 130° C. (from Nippon Steel Chemical Co., Ltd.)
[Component c]
c1: 2,4,6-trimethylbenzoylphenylethoxyphosphine oxide (from BASF)
c2: Benzophenone (from Tokyo Chemical Industry Co., Ltd.)
[Component d]
d1: 23G; Polyethylene Glycol Dimethacrylate, Number of Repeated Ether Linkages of 23, Molecular Weight of 1108 (from Shin Nakamura Chemical Co., Ltd.)
d2: 14G; Polyethylene Glycol Dimethacrylate, Number of Repeated Ether Linkages of 14, Molecular Weight of 708 (from Shin Nakamura Chemical Co., Ltd.)
d3: 9G; Polyethylene Glycol Dimethacrylate, Number of Repeated Ether Linkages of 9, Molecular Weight of 508 (from Shin Nakamura Chemical Co., Ltd.)
[Comparative Components to Component d]
d'1: 4G; Polyethylene Glycol Dimethacrylate, Number of Repeated Ether Linkages of 4, Molecular Weight of 308 (from Shin Nakamura Chemical Co., Ltd.)
d'2: ACMO; Acryloylmorpholine, Molecular Weight of 141 (from Kohjin Co., Ltd.)
d'3: DMAA; Dimethylacrylamide, Molecular Weight of 99 (from Kohjin Co., Ltd.)
d'4: Polyethylene Glycol; (Meth)Acrylic group-not-containing Polyethylene Glycol, Number of Repeated Ether Linkages of 12
d'5: Polyethylene Glycol; (Meth)Acrylic group-not-containing Polyethylene Glycol, Number of Repeated Ether Linkages of 20

[Other Component]
MEK: Methyl Ethyl Ketone.
[White Turbidity Test]
Producing Sheet The compositions of Examples 1 to 6 and Comparative Examples 1 to 9 were applied onto a peeling film made of polyethylene terephthalate (PET) respectively, and dried by removing a solvent under an environment at 100° C. Then, a PET peeling film was attached to the coated surface with the solvent removed therefrom to obtain a sheet-shape adhesive of 150 μm in adhesive layer thickness.

White Turbidity Test

One of the PET peeling films of the sheet-shape adhesive obtained as described above was peeled off, and stuck on a PET film of 125 μm in thickness. Then, this PET film with the sheet-shape adhesive stuck thereon was cut into 50 mm×50 mm. The PET peeling film was stripped off from the cut sample, the composition was stuck on a glass plate, and cured by ultraviolet irradiation such that the integral of light reached 30 kJ/m², thereby preparing a sample of glass plate/adhesive layer/PET film. The respective samples were left for 24 hours under the condition of 60° C./90% Rh. The above respective samples were taken out, then returned to room temperature, and visually confirmed in terms of appearance change. The results are shown in Tables 1 and 2.

<<Evaluation Criteria>>
◉: no white turbidity occurred.
○: slight white turbidity occurred.
x: obvious white turbidity occurred.

[Storage Stability Teat]

The compositions of Examples 1 to 6 and Comparative Examples 1 to 9 produced in accordance with Tables 1 and 2 were applied onto a PET peeling film respectively, and dried by removing a solvent under an environment at 100° C. Then, a PET peeling film was attached to the coated surface with the solvent removed therefrom to obtain a sheet-shape adhesive of 150 μm in adhesive layer thickness. This sheet-shape adhesive was left for one month under an environment at normal temperature and confirmed in terms of storage stability by the subsequent appearance change. The results are shown in Tables 1 and 2. The evaluation criteria are as follow.

<<Evaluation Criteria>>
◉: no gelation or crystallization was observed.
○: slight gelation or crystallization was observed.
x: gelation and crystallization was observed.

TABLE 1

| Name Of Component | Example 1 | Example 2 | Example 3 | Example 4 | Example 5 | Example 6 |
|---|---|---|---|---|---|---|
| a1 | 100 | 100 | 100 | 100 | 100 | 100 |
| a'1 | | | | | | |
| b1 | 30 | 30 | 30 | 30 | 30 | 30 |
| b'1 | | | | | | |
| c1 | 1 | 1 | 1 | 1 | 1 | |
| c2 | | | | | | 1 |
| MEK | 100 | 100 | 100 | 100 | 100 | 100 |
| d1 | | | 1 | | | |
| d2 | 3 | 5 | 2 | | | 3 |
| d3 | | | | 3 | 5 | |
| d'1 | | | | | | |
| d'2 | | | | | | |
| d'3 | | | | | | |
| d'4 | | | | | | |
| Evaluation Items | | | | | | |
| White Turbidity Test | ◉ | ◉ | ◉ | ○ | ○ | ○ |
| Storage Stability | ◉ | ◉ | ◉ | ◉ | ◉ | ◉ |

TABLE 2

| Name Of Component | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|
| a1 | 100 | 100 | 100 | 100 | 100 | 100 | | 100 | 100 | | 100 |
| a'1 | | | | | | | 100 | | | | |
| a'2 | | | | | | | | | | 100 | |
| b1 | 30 | 30 | 30 | 30 | 30 | 30 | 30 | 30 | | 30 | 30 |
| b'1 | | | | | | | | | 30 | | |
| c1 | 1 | 1 | 1 | 1 | 1 | 1 | 1 | 1 | 1 | 1 | 1 |
| c2 | | | | | | | | | | | |
| MEK | 100 | 100 | 100 | 100 | 100 | 100 | 100 | 100 | 100 | 100 | 100 |
| d1 | | | | | | | | | | | |
| d2 | | | | | | | | 3 | | 3 | |
| d3 | | 0.5 | | | | | | 70 | | | |
| d'1 | | | 5 | | | | | | | | |
| d'2 | | | | 5 | | | | | | | |

TABLE 2-continued

| Name Of Component | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|
| d'3 | | | | | 5 | | | | | | |
| d'4 | | | | | | 5 | | | | | |
| d'5 | | | | | | | | | | | 5 |
| Evaluation Items | | | | | | | | | | | |
| White Turbidity Test | X | X | X | X | ○ | X | X | X | X | X | X |
| Storage Stability | ◎ | ◎ | ◎ | ○ | X | ◎ | ◎ | ◎ | ◎ | ◎ | ○ |

[Transmittance Test]

The sheet-shape adhesives of Examples 1 to 3 and Comparative Example 8 on a PET film obtained in the same way as in the white turbidity test were attached to the entire surface of a glass plate of 3.0 mm×25 mm×50 mm in such a way that the sheet-shape compositions were brought into contact with the glass surface, and cured by ultraviolet irradiation such that the integral light reached 30 kJ/m². Then, this plate with the PET film removed therefrom was used as a test piece. The total light transmittance of this test piece was measured by a turbidity meter (NDH2000 from NIPPON DENSHOKU INDUSTRIES CO., LTD.) in conformity with the JIS-K-7361-1. The results are shown in Table 3.
○: total light transmittance was 85% or more
x: total light transmittance was less than 85%.

[Elastic Modulus Test]

The sheet-shape adhesives of Examples 1 to 3 and Comparative Example 8 on a PET film obtained in the same way as in the white turbidity test were cured by ultraviolet irradiation such that the integral light reaches 30 kJ/m². Then, the elastic modulus of the cured product was measured. A dynamic viscoelastic measurement device (DMS6100 from Seiko Instruments Inc.) was used as a measurement system. As a test piece, the sheet-shape compositions removed from the PET film were stacked on one another to prepare a sample of 0.6 mm in thickness, and the elastic modulus thereof at 25° C. was determined, and the results thereof are shown in Table 3. The measurement frequency was set to 1 Hz.
○: $10^8$ Pa or less
x: more than $10^8$ Pa

TABLE 3

|  | Example 1 | Example 2 | Example 3 | Comparative Example 8 |
|---|---|---|---|---|
| Transmittance | ○ | ○ | ○ | — |
| Elastic Modulus of Cured Product | ○ | ○ | ○ | x |

[Measurement of Elongation Percentage]

Ultraviolet ray was irradiated to each of the compositions of Examples 1 to 3 at 30 kJ/m² to produce a cured product. The cured product was cut to prepare a test piece so as to have the thickness of 0.6 mm, the total length of 50 mm, and the width of 10 mm. Then, the test piece was pulled by a tension tester until the test piece came to be cut, and subjected to the measurement in conformity with the JIS-K-6251 (2010). The results are shown in Table 4. The tension rate was set to 50 mm per minute.
○: elongation percentage of 500% or more
x: elongation percentage less than 500%

[Measurement of Peeling Bond Strength]

A PET film and an acrylic plate were stacked on one another with each of the compositions of Examples 1 to 3, and ultraviolet ray was irradiated at 30 kJ/m² to prepare a sample. The peeling bond strength of the sample was measured by 90° peeling at a peeling rate of 200 mm/minute according to the JIS-K-6854-1 (1999). The results are shown in Table 4.
○: 0.5 N/mm or more
x: less than 0.5 N/mm

TABLE 4

|  | Example 1 | Example 2 | Example 3 |
|---|---|---|---|
| Elongation Percentage | ○ | ○ | ○ |
| Peeling Bond strength | ○ | ○ | ○ |

The photocurable sheet-type adhesive composition for optical use of the present invention is used to bond a display module and a cover panel, a touch panel and the display module, and the cover panel and the touch panel, has high appearance reliability under high temperature and high humidity, is excellent in transparency, excellent in storage stability, and also excellent in mechanical characteristics of elongation percentage and peeling bond strength, and thus applicable in a wide range of fields, and industrially useful.

It is to be noted that the present application is based on Japanese Patent Application No. 2012-033441 filed on Feb. 17, 2012, and the disclosure thereof is incorporated herein by reference in its entirety.

EXPLANATION OF SYMBOLS

1 Image display device
2 Display module
3 Cover panel
4 Sheet-shape adhesive

The invention claimed is:
1. A photocurable adhesive sheet for optical use, the adhesive containing following components (A) to (D):
 (A) 100 parts by mass of a urethane (meth)acrylate oligomer having a weight average molecular weight of 20,000 to 100,000;
 (B) 3 to 70 parts by mass of a phenoxy resin having a glass transition temperature of 50 to 120° C.;
 (C) 0.1 to 10 parts by mass of a photopolymerization initiator; and
 (D) 1 to 50 parts by mass of a (meth)acrylate monomer which has 8 to 25 repeating blocks having an ether linkage in the molecule and contains at least one (meth)acryloyl group in the molecule.

2. The photocurable adhesive sheet for optical use according to claim 1, wherein the component (A) is a compound having at least one structure selected from the group consisting of polycarbonate skeleton, polybutadiene skeleton, and hydrogenated polybutadiene skeleton.

3. The photocurable sheet-shaped adhesive for optical use according to claim 1, wherein the (meth)acrylate monomer contains at least two (meth)acryloyl groups in the molecule.

4. An image display device including at least either a display module and a cover panel, a cover panel and a touch panel, or a touch panel and the display panel bonded with the photocurable adhesive sheet for optical use according to claim 1.

* * * * *